United States Patent [19]

Blouin

[11] Patent Number: 4,472,552
[45] Date of Patent: Sep. 18, 1984

[54] CONTINUOUS PROCESS FOR MAKING SOLID, FREE-FLOWING WATER DISPERSIBLE PVA-ALDEHYDE REACTION PRODUCT

[75] Inventor: John J. Blouin, Baltimore, Md.

[73] Assignee: W. R. Grace & Co., New York, N.Y.

[21] Appl. No.: 553,510

[22] Filed: Nov. 21, 1983

Related U.S. Application Data

[63] Continuation-in-part of Ser. No. 423,798, Sep. 27, 1982, abandoned.

[51] Int. Cl.³ ............................................... C08F 8/28
[52] U.S. Cl. .................................. 525/61; 252/8.5 A; 525/57
[58] Field of Search ........................................ 525/61

[56] References Cited

U.S. PATENT DOCUMENTS 4,240,915 12/1982 Block .............................. 252/8.5 A

FOREIGN PATENT DOCUMENTS 2073228 10/1981 United Kingdom .
2074636 11/1981 United Kingdom .

Primary Examiner—Joseph L. Schofer
Assistant Examiner—J. M. Reddick
Attorney, Agent, or Firm—Edward J. Cabic

[57] ABSTRACT

A polyvinyl alcohol-aldehyde reaction product is produced continuously in a rotating contactor by contacting solid particles of the polyvinyl alcohol with the aldehyde in an acidic aqueous salt solution. The product can be dried and then sieved to remove oversize particles. A preferred aldehyde is either formaldehyde or glutaraldehyde which reacts with the polyvinyl alcohol to produce a reaction product that can be used as a fluid loss control agent in oil fields.

18 Claims, 1 Drawing Figure

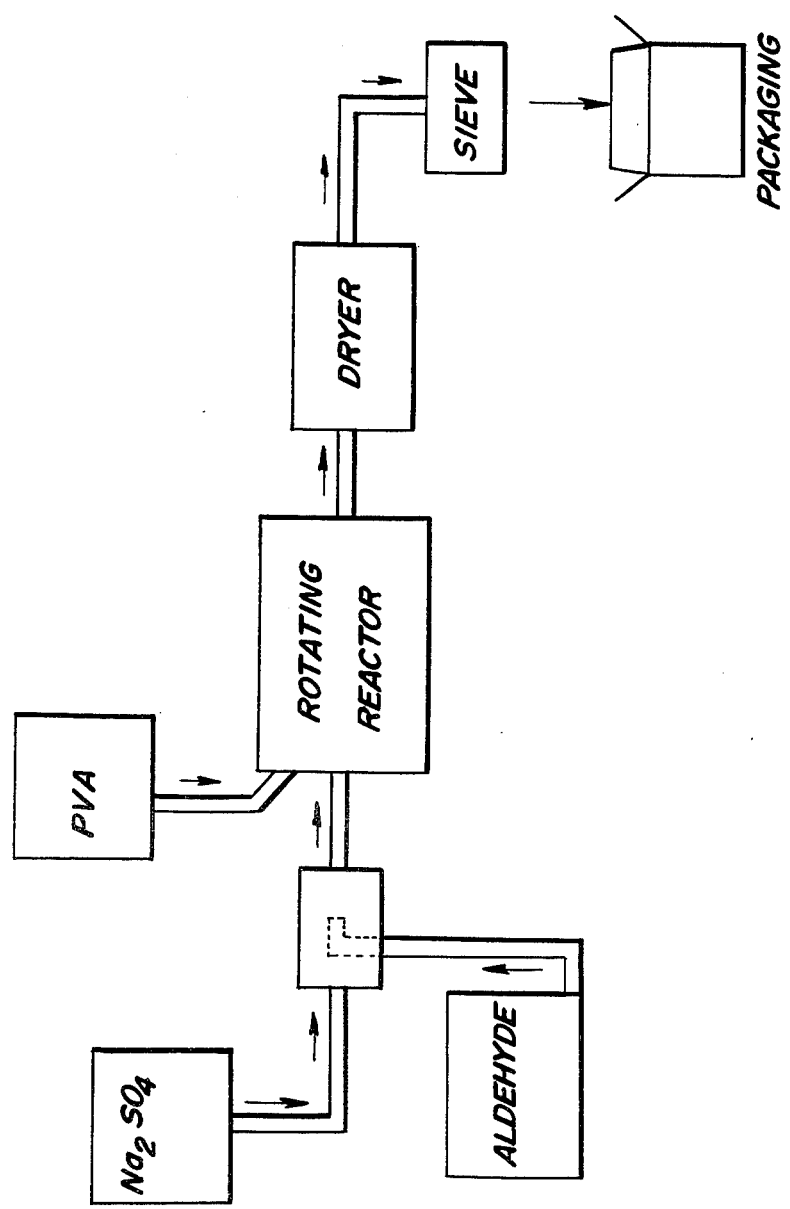

CONTINUOUS PROCESS FOR MAKING SOLID, FREE-FLOWING WATER DISPERSIBLE PVA-ALDEHYDE REACTION PRODUCT

CROSS-REFERENCE TO RELATED APPLICATIONS

This application is a continuation-in-part of U.S. Application Ser. No. 423,798, filed Sept. 27, 1982, now abandoned.

FIELD OF THE INVENTION

This invention relates to a continuous process to make a polyvinyl alcohol-aldehyde reaction product.

BACKGROUND OF THE INVENTION

A reaction product of polyvinyl alcohol (PVA) and an aldehyde such as formaldehyde has been found to be an effective water loss control agent to be used in oil fields. See, for example, "New Mud System Gets Field Trial" by J. Block in the Oil and Gas Journal, Jan. 11, 1982, pg. 79–82; U.K. patent application No. 2,074,636A where the reaction product is combined with a solid, particulate silicate or aluminosilicate material to form a fluid loss control system; and U.K. patent application No. 2,073,228A where the reaction product is combined with a hydroxy containing aluminum component. The reaction product has been made in batches in the laboratory by reacting polyvinyl alcohol with sub stoichiometric amounts of an aldehyde such as formaldehyde in a 16% sodium sulfate solution. The pH of the sodium sulfate is adjusted to about 2.3. The PVA is then slurred with this pH adjusted 16% sodium sulfate solution and then formaldehyde is added in the form of formalin which is a 37% aqueous solution stabilized with methanol. The mixture is heated to about 16°–21° F. (60°–70° C.) for about 10–15 minutes. The reacted solid is filtered to remove excess solution. The resultant filter cake is then placed in a batch dryer where it is dried to its pre-requisite total volatile content which is approximately 3 wt.% (determined at 100° C.). The solid particles are ground and screened to give the desired size fraction which is packaged. Using this batch reactor and the required batch dryer results in large clumps or agglomerates. These large particles have a "gummy" appearance and they stick together. As a result these large particles must be ground to obtain the smaller particle sizes preferred for packaging.

In addition to the deficiency that this is only a batch process, it also requires five unit operations involving a reactor, a centrifuge to separate the product from the reactor liquid, a dryer, a grinder to reduce the size of the particles produced and a sieve to insure obtaining the required on size particles for packaging.

OBJECTS OF THE INVENTION

It is an object of this invention to obtain a continuous process to produce a polyvinyl alcohol-aldehyde reaction product.

It is a further object to operate the continuous process in a manner which reduces the number of unit operations required to produce the polyvinyl alcohol-aldehyde reaction product.

It is a further object to continuously produce a polyvinyl alcohol-aldehyde reaction product without having to centrifuge the product from the reactor liquid and without having to grind a large amount of oversize particles from the dryer.

It is a further object to continuously produce a polyvinyl alcohol-aldehyde reaction product material having small enought size moist particles that they can be taken directly from the dryer and packaged for use.

It is a further object to produce a water-based drilling fluid containing this continuously produced polyvinyl alcohol-aldehyde reaction product and to drill a bore hole in subterranean formations using this drilling fluid containing the continuously produced polyvinyl alcohol-aldehyde reaction product.

It is a further object to inhibit fluid loss from an aqueous drilling fluid in subterranean formations by using this drilling fluid containing the polyvinyl alcohol-aldehyde reaction product.

These and other objects will become apparent as the description of the invention proceeds.

SUMMARY OF THE INVENTION

This process invention relates to the continuous production of a polyvinyl alcohol-aldehyde reaction product by simultaneously feeding to a rotating continuous contactor solid polyvinyl alcohol, an aldehyde and a warm salt solution such as a preferred 16% sodium sulfate solution that has been adjusted to a pH in the range of about 1.5 to 3.0, more preferably from about 1.9 to 2.3, and heated to about 90° F. (32° C.). In one preferred embodiment that aldehyde is formaldehyde which is supplied in the form of 37% formaldehyde in water solution stabilized with 10% methanol. In another preferred embodiment the aldehyde is glutaraldehyde which is supplied in the form of a 25% glutaraldehyde in water solution. The resultant mixture containing either of the aldehydes is contacted for a relatively short period of time, which can be less than one minute and, more preferably, in the apparatus described hereafter for approximately 35 seconds, before being continuously discharged to a continuous dryer.

The moist reaction product passes through the vented dryer which operates under atmospheric pressure at a relatively low temperature of approximately 140° F. (60° C.). After a residence time of about 140 minutes a dry, free flowing material having a total volatility, T.V., of between 3 and 4 wt.% is produced as measured by an Ohaus Moisture Determination Balance. This desired dried, uncaked finished product is discharged directly to a packaging operation.

A comparison of the batch operation and this continuous process shows that the batch operation requires 5 unit operations involving a reactor, a centrifuge to separate the product from the reactor liquid, a dryer, a grinder to reduce the size of the large particles produced by the batch process and a sieve to insure obtaining the required on size particles for packaging. The continuous operation according to this invention requires only 3 unit operations involving the reactor, the dryer and the sieve to remove any oversize particles so that only the proper, smaller size particles are packaged.

The moist product leaving the continuous reactor can also be dried by a batch drying process where the material is dried in an oven.

BRIEF DESCRIPTION OF THE DRAWING

The FIGURE is a block flow diagram illustrating the process of this invention.

DESCRIPTION OF THE PREFERRED EMBODIMENTS

When using an alumina viscosifier, it is desirable to have a compatible water loss control agent so that the system has a total fluid loss of less than 10 cc. when measured by the API procedure RP-13B described infra. One example of a compatible water loss agent is a dispersible polyvinyl alcohol-aldehyde reaction product.

This reaction product has previously been made in batches and by the present procedure it can be made continuously and with less process equipment.

In conducting the continuous process, solid particles of polyvinyl alcohol are added to the inlet of the rotating continuous reactor. A preferred form of PVA is Gelvatol 20-90 made by Monsanto Industrial Chemicals Co. The molecular weight for the Gelvatol family PVA can vary from about 2,000 to 125,000 with the Gelvatol 20-90 having a molecular weight of 125,000. There are many manufacturers of PVA. The preferred PVA weight average molecular weight is at least 20,000 with a more preferred range being from about 90,000 to 200,000. In the preferred forms the PVA is at least about 75 percent hydrolyzed and more preferably from about 80 to 95 percent hydrolyzed.

After entry of the solid PVA particles in the mixer reactor they are contacted with a salt solution and an aldehyde preferably in a solution form. In the more preferred embodiment illustrated in the FIGURE, the aldehyde solution, which is preferably either formaldehyde or glutaraldehyde, is injected into a sodium sulfate solution so the two materials have an opportunity to thoroughly mix before the liquid mixture is fed to the solid PVA particles in the reactor.

The concentration, acidity and temperature of the sodium sulfate solution are controlled for optimum use. The optimum sodium sulfate concentration is about a 16 weight % solution because this is approaching a saturated solution and any higher amount would begin to salt out. Lower concentrations could be employed, but that would add additional water to the final reaction product which must later be removed by the dryer.

The pH of the sodium sulfate solution is also controlled. In order for an aldehyde to react with PVA it is necessary to have acidic conditions. The preferred pH range when using formaldehyde or glutaraldehyde as the aldehyde is from about 1.5 to about 3.0. For this formaldehyde or glutaraldehyde system at lower pHs such as 1.4 the resulting reaction product does not have the desired controlled fluid loss property when evaluated under the high temperature fluid loss test. Similarly, if the pH is too high such as around 2.8, the materials do not react and thus the resulting reaction product does not have the desired cross-linked properties.

The PVA-aldehyde reaction proceeds more satisfactorily at elevated temperatures. However, if external heat is applied to the rotating reactor, undesirable reaction deposits develop on the inside of the reactor. An optimum way to supply heat to the reactor is to preheat the sodium sulfate solution which is the largest liquid component added to the reactor. For the apparatus described in Example 1, good results are achieved when the solution is heated to about 90° F. (32° C.). For the formaldehyde or glutaraldehyde systems, heating to only 70° F. (21° C.) did not work as well. On the other hand, if the solution is heated too high, then the product becomes tacky and difficult to handle. A preferred temperature range to preheat the solution is from about 85° F. to 140° F. (29°–60° C.).

Up to this point, only the preferred sodium sulfate solution has been discussed. The purpose of this solution is to prevent the PVA from solubilizing in the acid solution. When the PVA is commercially produced, the PVA is recovered from the reaction solution by adding a salt such as sodium sulfate that causes the dissolved PVA to form an insoluble solid. Here a similar procedure is being used; by adding the salt the PVA is prevented from dissolving back into solution. Sodium sulfate is the preferred salt because it is very efficient in preventing the PVA from dissolving while it keeps the PVA swollen for reaction. It is also compatible since it is the salt used commercially when making PVA. However, other salts could be used such as sodium chloride, sodium phosphate, sodium carbonate, potassium chloride, potassium sulfate, etc.

The reaction product is made by using an aldehyde which reacts with the PVA. One of the preferred aldehydes is formaldehyde and the preferred form is the commercially available formalin which is an aqueous solution of 37% formaldehyde which has been stabilized with from 6–15% methanol. Suppliers of this material include J. T. Baker Chemical Co., Hercules, and Ashland Chemical Co. Other commercial grades of formaldehyde and its polymers could be used. Such commercial grades include 44, 45 and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves. If it has not dissolved, then the solid material may remain unreacted when the reaction product is formed and this paraformaldehyde can produce unwanted hazardous vapor when it and the reaction product are subsequently heated in the dryer.

Another preferred aldehyde is glutaraldehyde. Other aldehyde containing or generating reactants are organic chemical compounds which contain at least one aldehyde group therein as are well known and include, for example, formaldehyde, acetaldehyde, propionaldehyde, glycolaldehyde, glyoxylic acid and the like or polyaldehydes i.e., organic compounds having more than one aldehyde group in the compound, such as glyoxal, paraformaldehyde and the like. Other suitable aldehyde reactants include aldehyde generating agents i.e. known organic compounds capable of forming an aldehyde group in situ, such as melamine-formaldehyde monomeric products and derivatives such as tri and hexa(methylol) melamine and the tri and hexa ($C_1$–$C_3$ alkoxymethyl) melamine. Such materials can be formed by known conventional methods. The alkyl blocked derivatives are commercially available, are stable to self polymerization and are, therefore, preferred. Of all of the aldehyde reactants, the preferred reactants are paraformaldehyde, formaldehyde and glutaraldehyde.

The amount of the aldehyde added to the reaction mixture must be controlled. If too much aldehyde is added the product is over cross-linked yielding a material that does not have the desired low controlled flow loss value of less than 10 cc.

When the aldehyde reacts with the polyvinyl alcohol, two OH groups react with one aldehyde group. Based on this stoichiometry the amount of aldehyde added is at least about 0.1% and preferably from about 1 to 80 and most preferably from about 2 to 50 percent of stoichiometry of an aldehyde reactant based on the hydroxyl content of the polyvinyl alcohol. On a weight basis, the preferred weight ratio of formaldehyde to polyvinyl alcohol is about 0.0095:1 and for glutaraldehyde to polyvinyl alcohol it is about 0.0016:1. Excess aldehyde can be used. The particular amount of aldehyde agent will depend on its solubility in the aqueous reaction media, and its reactivity as is known and determinable by conventional means.

As indicated above, the preferred technique to add the aldehyde and the sodium sulfate solution to the mixer reactor is to first add the aldehyde to the sodium sulfate solution. As seen in the FIGURE, the heated sodium sulfate solution is fed into an enlarged pipe where an injection tube is inserted to feed the aldehyde solution. These two liquids mix and then proceed to flow into the mixer reactor.

As the solid PVA particles travel through the reactor, they mix and react with the sodium sulfate and aldehyde solution to form the desired reaction product. Using a contactor such as the Zig-Zag Blender in Example 1, it is possible to have a contact time which is less than one minute and which, for this specific reactor, is on the order of only about 35 seconds. The resulting reaction product is preferably immediately dried to prevent any further reaction.

The type of drying operation is not critical and can be done either with a batch dryer or a continuous dryer. Since the reactor is continuous, the preferred embodiment is to also use a continuous dryer which is vented to the atmosphere. Because of the relatively low water content, it is possible to use a low temperature dryer which operates at a temperature of 140° F. (60° C.). This lower temperature is desired to prevent any thermal cross-linking of the rection product which would result in a brownish colored material. Further benefits of using this lower temperature is that energy is conserved. Using this dryer and a residence time of between 2 and 3 hours, it is possible to produce a dry, free flowing product which has a total volatility of only 3 to 4 weight %. These particles are generally of the desired small size so that they can be directly packaged. A sieve screen such as a 6 mesh screen can be used to remove any of the oversize particles before packaging.

The products made by the process of this invention can be used as a fluid loss controlling agent in a water based drilling fluid suitable for circulating in a bore hole while drilling the bore hole into subterranean formations. This drilling fluid contains at least water and in the preferred embodiment a weighting agent. The polyvinyl alcohol-aldehyde reaction product is present in the fluid in from about 0.1 to 15 percent by weight based on the weight of the water present in the fluid. The fluid is maintained at a pH of from 8 to 12 and the aldehydes used are preferably formaldehyde or glutaraldehyde.

By using the product made by the process of the present invention in combination with an aqueous drilling fluid in an amount of from about 0.1 to 15 percent by weight based on the weight of the water present in the drilling fluid and maintaining the system at a pH of from 8 to 12, there results a method of inhibiting fluid loss from an aqueous drilling fluid in subterranean formations. Again, the aldehydes used are preferably formaldehyde or glutaraldehyde.

The drilling fluid containing the reaction product made according to the present invention can be used in the process of drilling a bore hole into a subterranean formation using conventional bore hole drilling equipment. In this embodiment the drilling fluid containing the reaction product made according to the present invention is circulated in the bore hole while drilling. Again, the aldehydes used are preferably formaldehyde or glutaraldehyde.

Test Procedures

The fluid loss property of this reaction product is determined by the American Petroleum Institute procedure API No. RP-13B. At ambient temperature a sample is placed in a vessel having a screen on the bottom over which a filter paper is placed. Pressure (100 psig) is applied and the amount of liquid that flows out in 30 minutes is measured and identified as the control total fluid loss, TFL. It is desirable to have the TFL value less than 15 cc. and more preferably at a value of 10 cc. or less.

An additional test for fluid loss is the roller oven test where the reaction product is heated on a rolling device in an oven at 250° F. (121° C.) for 16 hours. This is intended to simulate the conditions in a well where shear forces exist in addition to elevated temperatures. The TFL is determined on the cooled sample and again it is desirable to have a TFL value less than 15 cc. and preferably at a value of 10 cc. or less.

In both of these tests the test liquid contained 2.4% AlO(OH) as described in U.S. Pat. No. 4,240,915, the content of which is incorporated herein by reference and 1.6% of the poly(vinyl alcohol)-aldehyde product.

Having described the basic aspects of our invention, the following examples are given to illustrate specific embodiments thereof.

EXAMPLE 1

In this example, the primary reacting or contacting equipment is a Patterson-Kelly Zig-Zag Blender Model 8-CLSS made of 316 Stainless Steel. It has a tube diameter of 9 inches, a working length of 31 inches and it operates at 32 revolutions per minute. To this contactor, polyvinyl alcohol, Gelvatol 20-90 made by Monsanto Industrial Chemicals Co., was fed at a rate of 2.5 lbs. per minute. Concurrently, a 16% sodium sulfate solution adjusted to a pH of 1.65 by adding sulfuric acid and warmed to a temperature of 90° F. (32° C.) was added. This liquid was injected through a (centrifugal) intensifier (droplet producing) system at a feed rate of 2.0 lbs. per minute. A formaldehyde solution (37% formaldehyde in water containing 10% methanol) was co-injected at a ratio of 1.2 ml./50 g. of PVA along with the 16% sodium sulfate solution into the dispersed solid PVA. The process was run continuously for a period of two hours. The material had a short residence time in the reactor and it then passed to a TorusDisc Dryer made by Strong and Scott Mfg. Co. operating at a temperature of 140° F. (60° C.). In the dryer the residence time was about 2 hours.

Using the test procedures described earlier, the resulting product had the following properties.

Fluid Loss Test Results

Control TFL: 9.3 cc.
Roller Oven TFL: 7.1 cc.

These properties of this continuously produced material were about equal to or better than the product produced in the batch reactor to be described below. All materials produced by this contacting method have been adjudged excellent in terms of water loss control properties.

COMPARISON EXAMPLE 1

This comparative example describes a batch process for making the reaction product.

In a 200 gallon, glass lined jacketed reactor 76 gallons of a 16% $Na_2SO_4$ solution was added. This solution has been adjusted to a $pH=2.8\pm0.2$ with $H_2SO_4$. The reactor agitator was started (70 RPM) and 250 pounds of Gelvatol 20-90 added. The mixture was stirred for 15 minutes and then 34 pounds of solid paraformaldehyde were added. The reactor was heated to 140° F. (60° C.) and maintained at that temperature for 30 minutes. The reactor was then cooled to 100° F. (38° C.) and approximately ⅓ of the batch was allowed to discharge into a cloth lined basket centrifuge. The solids were separated from the mother liquor as centrifuging continued for 10 minutes. The centrifuge was unloaded manually and the material placed directly into drying trays. This loading, centrifuging, unloading operation was repeated two more times to complete the discharge of the reactor. After all of the material was placed into drying trays, the trays were loaded into a batch tray drier which was operating under vacuum (28 inches of mercury) and at a temperature of 185° F. (85° C.) Drying continued for about 16 hours until the total volatility was between 3-5% as measured on an Ohaus Moisture Determination Balance.

The dryer was then discharged and the content of the trays was cut into 4"×4" pieces. These pieces were ground in a mill and sieved through a 6 mesh screen to remove oversized materials. The oversized materials were reground and sieved. Approximately 240 lbs. of on-size material was obtained through this process which was then packaged.

Using the same test procedures, the product had the following properties.

Fluid Loss Test Results

Control TFL: 7.1 cc.
Roller Oven TFL: 13.6 cc.

The batch process required 5 units operations (reactor, centrifuge, dryer, mill and sieve) and 12 man-hours to make the 240 pounds. In contrast, the continuous operation only requires 3 unit operations (reactor, dryer, and sieve) and only about 96 operator minutes to make the same quantity of product.

EXAMPLE 2

This example illustrates another procedure to continuously produce the reaction product and to have batch drying.

The procedure of Example 1 was followed to continuously make the reaction product. The product was placed in a Pyrex glass tray and placed in an oven at 140° F. (60° C.) overnight to dry. The resulting product had the following properties.

Fluid Loss Test Results

Control TFL: 9.2 cc.
Roller Oven TFL: 8.0 cc.

EXAMPLE 3

This example illustrates another polyvinyl alcohol used in the continuous process.

The continuous procedure of Example 1 was followed except that the polyvinyl alcohol was 540S made by Air Products Company and the pH was 1.9 instead of 2.3. The resulting product had the following properties.

Fluid Loss Test Results

Control TFL: 5.9 cc.
Roller Oven TFL: 5.2 cc.

EXAMPLE 4

This example illustrates using glutaraldehyde in the continuous process.

The continuous procedure of Example 1 was followed except that the pH of sodium sulfate solution was adjusted to a pH of 1.90 and the aldehyde used was a glutaraldehyde solution (25% glutaraldehyde in water from J. T. Baker Co.) which was co-injected at a ratio of 0.72 ml/pound of PVA along with the 16% sodium sulfate solution into the dispersed solid PVA. The process was run continuously for a period of six hours.

Using the test procedures described earlier, the resulting product had the following properties:

Fluid Loss Test Results

Control TFL: 5.3 cc
Roller Oven TFL: 6.6 cc

All materials produced by this contacting method have been adjudged excellent in terms of water loss control properties.

EXAMPLE 5

This example illustrates another polyvinyl alcohol used in the continuous process with glutaraldehyde The continuous procedure of Example 4 was followed except that the polyvinyl alcohol was 540S made by Air Products Company. The resulting product had the following properties:

Fluid Loss Test Results

Control TFL: 5.6 cc
Roller Oven TFL: 7.9 cc

EXAMPLE 6

This example illustrates another polyvinyl alcohol used in the continuous process with glutaraldehyde.

The continuous procedure of Example 4 was followed except that the polyvinyl alcohol was Gelvatol 9000 made by Monsanto. The resulting product had the following properties:

Fluid Loss Test Results

Control TFL: 5.8 cc
Roller Oven TFL: 5.8 cc

EXAMPLE 7

This example illustrates using larger amounts of glutaraldehyde in the continuous process.

The continuous process of Example 4 was followed except that the amount of glutaraldehyde added to the system was varied. The resulting products had the following properties:

| Run | Glutaraldehyde/PVA (ml/lb. PVA) | Control TFL (cc) | Roller Oven TFL (cc) |
|-----|-------------------------------|------------------|----------------------|
| A   | 1.4                           | 6.2              | 7.2                  |
| B   | 2.0                           | 5.6              | 5.7                  |

Both of these runs produced acceptable products.

EXAMPLE 8

This example illustrates larger amounts of glutaraldehyde in the continuous process with Gelvatol 9,000.

The continuous process of Example 6 using Gelvatol 9,000 was followed except that the amount of glutaraldehyde added to the system was varied. The resulting products had the following properties:

| Run | Glutaraldehyde/PVA (ml/lb. PVA) | Control TFL (cc) | Roller Oven TFL (cc) |
|-----|---------------------------------|------------------|----------------------|
| A   | 1.0                             | 6.0              | 7.5                  |
| B   | 1.4                             | 6.4              | 6.8                  |
| C   | 2.0                             | 6.6              | 9.7                  |

All of these runs produced acceptable products.

It is understood that the foregoing detailed description is given merely by way of illustration and that many variations may be made therein without departing from the spirit of this invention.

What is claimed is:

1. A process for the continuous production of a polyvinyl alcohol-aldehyde reaction product comprising
    (a) adding to a rotating continuous reactor to form a mixture
        (i) solid particles of polyvinyl alcohol,
        (ii) an aldehyde, and
        (iii) an aqueous salt solution adjusted to have an acidic pH;
    (b) mixing the mixture of step (a) in the reactor until a polyvinyl alcohol-aldehyde reaction product is obtained; and
    (c) drying the polyvinyl alcohol-aldehyde material.

2. A process according to claim 1, wherein the aldehyde is formaldehyde or glutaraldehyde.

3. A process according to claim 2, wherein the formaldehyde is in the form of an aqueous solution of formaldehyde stabilized with methanol.

4. A process according to claim 3, wherein the formaldehyde concentration is about 37% by weight.

5. A process according to claim 2, wherein the formaldehyde is added as paraformaldehyde and the amount added is less than the stoichiometric amount needed to react with the polyvinyl alcohol.

6. A process according to claim 1, wherein the pH of the salt solution is from about 1.5 to about 3.0.

7. A process according to claim 6, wherein said pH is from about 1.9 to 2.3.

8. A process according to claim 1, wherein the salt solution is a sodium sulfate solution.

9. The process according to claim 8, wherein the sodium sulfate concentration is about 16 weight percent in the aqueous solution.

10. A process according to claim 1, wherein the salt solution is heated to a temperature between about 85° F. and 140° F.

11. A process according to claim 1, wherein the polyvinyl alcohol has a weight average molecular weight of at least 20,000.

12. A process according to claim 1, wherein the polyvinyl alcohol has a weight average molecular weight of from about 90,000 to 200,000 and is at least about 75 percent hydrolyzed.

13. A process according to claim 12, wherein the polyvinyl alcohol is from about 80 to 95 percent hydrolyzed.

14. A process according to claim 2, wherein the weight ratio of formaldehyde to polyvinyl alcohol is about 0.0095:1.

15. A process according to claim 2, wherein the weight ratio of glutaraldehyde to polyvinyl alcohol is about 0.0016:1.

16. A process according to claim 1, wherein the salt solution is a sodium sulfate solution and the sodium sulfate solution and aldehyde are first premixed before being mixed with the polyvinyl alcohol.

17. A process according to claim 1, wherein the drying is done in a continuous dryer.

18. A process according to claim 1, wherein the drying is done in a batch dryer.

* * * * *